United States Patent [19]
Veret et al.

[11] Patent Number: 5,273,141
[45] Date of Patent: Dec. 28, 1993

[54] BLEED VALVE FOR A HYDRAULIC CIRCUIT AND PROCESS FOR BLEEDING A HYDRAULIC CIRCUIT EQUIPPED WITH SUCH A VALVE

[75] Inventors: Dominique Veret, Surenes; Patrick Audrain, Tremblay-en-France, both of France

[73] Assignee: Bendix Europe Services Techniques, Drancy, France

[21] Appl. No.: 808,125

[22] Filed: Dec. 13, 1991

[30] Foreign Application Priority Data

Dec. 20, 1990 [FR] France ................ 90 16027
Feb. 7, 1991 [FR] France ................ 91 01360

[51] Int. Cl.⁵ .................. F16K 31/383; B60T 11/30
[52] U.S. Cl. ......................... 188/352; 303/86; 60/584; 137/68.1; 251/321; 251/335.2; 251/297
[58] Field of Search ............. 188/352; 303/86, 84.2, 303/113 R, 116 R, DIG. 2, DIG. 6; 60/584; 137/624.27, 68.1; 251/321, 335.2, 297

[56] References Cited

U.S. PATENT DOCUMENTS

| | | | |
|---|---|---|---|
| 2,379,692 | 7/1945 | Dodson | 303/84.2 X |
| 3,425,750 | 2/1969 | Deane | 303/6 |
| 4,902,077 | 2/1990 | Belart et al. | 188/352 X |
| 5,036,666 | 8/1991 | Vasselet | 60/584 |

FOREIGN PATENT DOCUMENTS

| | | | |
|---|---|---|---|
| 0983814 | 2/1976 | Canada | 251/321 |
| 2548609 | 1/1985 | France . | |
| 892817 | 3/1962 | United Kingdom . | |
| 1160687 | 8/1969 | United Kingdom . | |

*Primary Examiner*—Robert J. Oberleitner
*Assistant Examiner*—Josie A. Ballato
*Attorney, Agent, or Firm*—Larry J. Palguta; Ken C. Decker

[57] ABSTRACT

The invention relates to a bleed valve for a hydraulic circuit, comprising a piston capable of sliding in a bore formed in a body and actuating a shutter arranged between two sub-circuits and movable between a first position, in which it allows communication between the two sub-circuits, and a second position, in which it prevents this communication, the shutter being movable under the effect of an external mechanical action exerted by an actuating member. According to the invention, the sealing between the bore and the outside of the body is ensured by the actuating member, and the shutter is movable under the effect of a difference between the pressures which are exerted on its two faces.

19 Claims, 3 Drawing Sheets

PRIOR ART

BLEED VALVE FOR A HYDRAULIC CIRCUIT AND PROCESS FOR BLEEDING A HYDRAULIC CIRCUIT EQUIPPED WITH SUCH A VALVE

The subject of the present invention is a bleed valve for a hydraulic circuit, for example for a motor-vehicle brake circuit.

During the filling of such brake circuits, it is customary and known in general as "vacuum bleeding" to generate a relatively high vacuum in the brake system, before filling the latter with brake fluid, by working via the feed reservoir of the master cylinder, so that no air is included in the brake circuit when fluid is being supplied after the vacuum as been applied.

Modern brake circuits can consist of a plurality of sub-circuits, between which can be arranged shutters which are closed in their rest position and which therefore prevent communication between the sub-circuits. It thus follows that some parts of the hydraulic circuit are isolated and are therefore not bled. It is then necessary to act externally on these shutters, for example mechanically, in order to keep them in their opening position, so that the entire hydraulic circuit is involved in the vacuum-bleeding operation.

The document U.S. Pat. No. 4,831,826 makes known a bleed valve which makes it possible to bleed a hydraulic circuit and in which a shutter is kept open as a result of external mechanical action on one end of a piston, the other end of which forms the shutter itself. The disadvantage of this valve, however, is that the sealing between the interior and exterior of the valve is ensured by the piston itself which is integral with the shutter, thus giving rise to a constant closing position of the shutter. If communication between sub-circuits is desired, for example under the effect of a pressure difference between these sub-circuits, another valve will then have to be added in parallel with the shutter, thereby resulting in an increased complexity and cost of the hydraulic circuit.

The document U.S. Pat. No. 3,425,750 makes known a valve which is adapted to delay pressurization between front brakes and rear brakes while allowing an easy bleeding of the hydraulic circuits. However, such a valve cannot form part of a one-way valve.

It is therefore an object of the present invention to provide a bleed valve for a hydraulic circuit, which is of simple, robust and reliable design and the shutter movements of which remain free in order to allow it to function as a one-way valve.

For this purpose the invention provides a bleed valve for a hydraulic circuit, comprising a piston capable of sliding in a bore formed in a body and actuating a shutter arranged between two sub-circuits and movable between a first position, in which it allows communication between the two sub-circuits, and a second position, in which it prevents this communication, the shutter being movable under the effect of an external mechanical action exerted by an actuating member.

According to the invention, the sealing between the bore and the exterior of the body is ensured by the actuating member, and the shutter is movable under the effect of a difference between the pressures which are exerted on its two faces.

This results in a simple and reliable design, in which the movement of the shutter is completely free.

Another object of the present invention is a process for bleeding a hydraulic circuit comprising a bleed valve according to the present invention.

Such a process involves the following steps:
- a force is exerted on the actuating member so that the latter comes into contact with the piston in order to bring the shutter into its first position,
- the vacuum bleeding of the hydraulic circuit is carried out
- the force exerted on the actuating member is released so that the latter loses contact with the piston when the shutter is returned to its second position under the effect of a return spring.

The invention will now be described by way of example with reference to the accompanying drawings in which.

Figure 1:
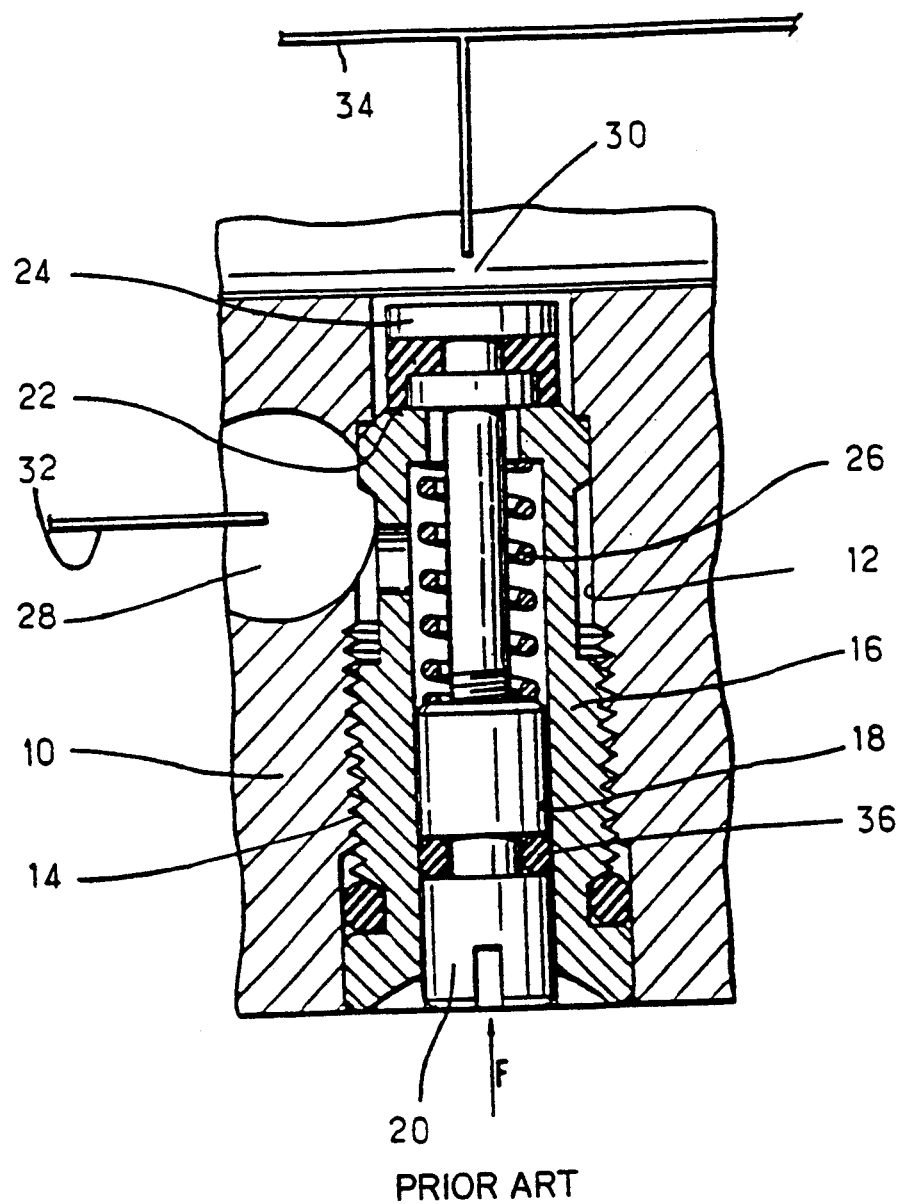
FIG. 1 shows a section through a bleed valve of the prior art.

FIG. 1 shows a section through a bleed valve, as known, for example, from U.S. Pat. No. 4,831,826. This valve comprises a housing 10, in which a cylindrical bore 12 is made. Screwed into a helical thread 14 of the cylindrical bore 12 is an insertion bush 16 comprising a bore 18, in which a piston 20 is arranged slideably. The upper end ("upper", as seen in FIG. 1) of the insertion bush 16 is arranged as a valve seat 22 which, in interaction with the end portion 24 of the piston 20, forms the "valve passage" of this valve. The piston 20 is prestressed by a compression spring 26 in the direction corresponding to the closing of the valve passage 22, 24. The valve passage 22, 24 allows or interrupts communication between two connections 28, 30 connected respectively to sub-circuits 32, 34, the end portion of the piston 20 remote from the shutter member 24 carrying a sealing ring 36 interacting with the bore 18.

The operation of the vacuum bleeding of the hydraulic circuit in which the valve just described is inserted is carried out by applying a filling device (not shown) sealingly to one of the sub-circuits 32 or 34. A vacuum pump is then activated and sucks air from the circuit. During this process, the piston 20 is subjected to a force F which keeps the valve passage 22, 24 in an opening position, the force F being supplied, for example, by means of a rod.

When the pressure in the circuit has been lowered to a requisite value, an air-outlet pipe of the filling device (not shown) is closed, and hydraulic fluid which is under a low pressure is introduced into the circuit. After the filling of the circuit, the force F is cancelled, so that the compression spring moves the piston 20 into the position which is shown in FIG. 1 and in which the valve passage 22, 24 is closed. It can therefore be seen that, unless there is action from outside, the shutter will always remain closed and will isolate the circuits 32 and 34 from one another.

Figure 2:
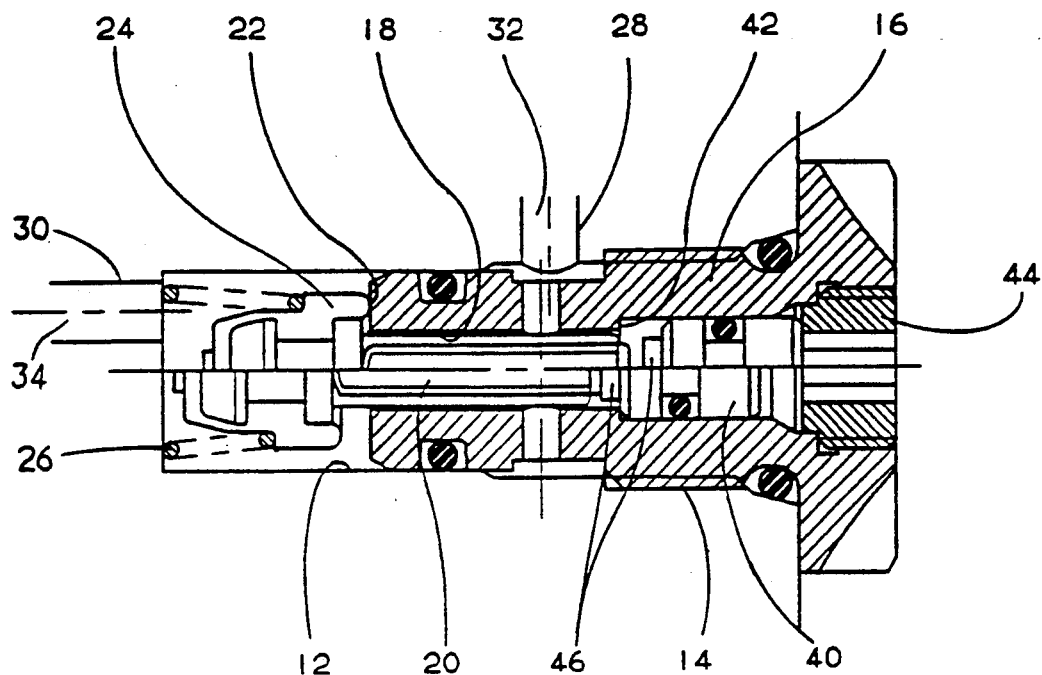
FIG. 2 shows a section through a first embodiment of a bleed valve produced according to the present invention.

This disadvantage is avoided by means of the invention, one embodiment of which has been shown in FIG. 2, where the same elements as those of FIG. 1 bear the same reference numerals. The upper half of FIG. 2 shows the bleed valve in its rest position, and the lower half shows the same valve during the vacuumbleeding operation.

FIG. 2 illustrates a first embodiment of a bleed valve produced according to the present invention, consisting of a piston 20 sliding in a bore 18 formed in a body 16. The left-hand end (as seen in FIG. 2) of the piston 20 forms a shutter 24 interacting with a shutter seat 22 formed on the body 16. The shutter 24 is returned to its rest position by a spring 26 and, depending on its position, allows or prevents communication between connections 28 and 30 connected respectively to two subcircuits 32 and 34.

A second piston 40 arranged on the side of the piston 20 opposite the shutter 24 slides sealingly in the bore 18. The movement of the second piston 40 is limited on one side by a shoulder 42 formed in the bore 18 and on the other side by a nut 44 screwed into the end of the bore 18 opening outward. The second piston 40 carries, on its face confronting the piston 20, a cylindrical extension 46 of a diameter smaller than that of the bore 18.

During a vacuum-bleeding operation, a force is exerted on the second piston 40 for example by means of a jack or a rod passing through the nut 44, in such a way that the cylindrical extension 46 comes into contact with the piston 20 and pushes the latter so as to put the shutter 24 into an opening position, in which it allows communication between the two sub-circuits 32 and 34, as illustrated by the lower half of FIG. 2. After the complete circuit has been put under a vacuum and subsequently filled with hydraulic fluid, made possible by the opening of the shutter 24, the force exerted on the second piston 40 is released, the latter returning to the right (as seen in FIG. 2), first under the effect of the spring 26 acting on the shutter 24 and on the piston 20 and then under the effect of the hydraulic pressure prevailing in the bore 18, until it is stopped by the nut 44. The shutter 24 has then returned to a closing position, in which it prevents communication between the two sub-circuits 32 and 34 and the second piston 40 is at rest against the nut 44, as illustrated by the upper half of FIG. 2.

It can thus be seen that, as a result of the invention, the sealing of the bleed valve relative to the outside is ensured by the second piston 40 which performs the function of a member for actuating the piston 20 for the bleeding operation, thereby leaving the piston 20 and therefore the shutter 24 free to move under the effect of a difference between the pressures exerted on its two faces. The shutter 24 can, for example, open when the pressure in the sub-circuit 32 is sufficient to overcome the force of the spring 26 and the pressure in the sub-circuit 34, this occurring without any obstruction. This will be useful particularly if the connection 28 is connected, in normal operation, to a pump, as the case may arise in a wheel antilocking device. In this case, the shutter 24 will operate as the one of a one-way valve.

Figure 3:
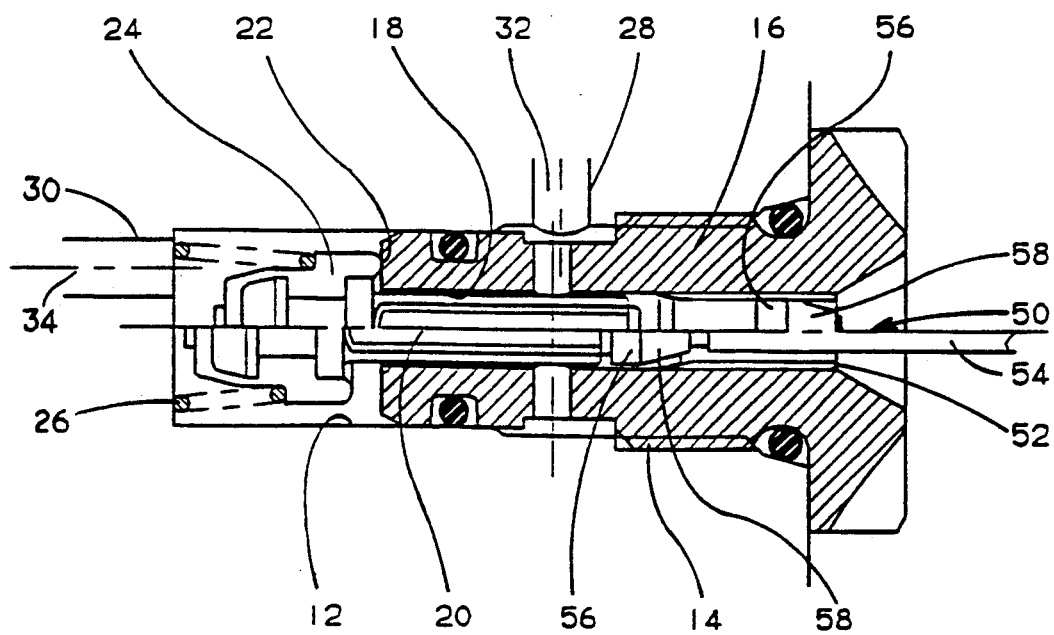
FIG. 3 shows a section through a second embodiment of a bleed valve produced according to the present invention.

FIG. 3 illustrates a second embodiment of the invention, where the actuating member of the piston 20 consists of a self-sealing element designated as a whole by the reference 50. This self-sealing element comprises a tubular piece 52 of an outside diameter in the neighborhood of that of the bore 18 and having passing through it a rod 54, one end 56 of which is of a diameter larger than that of the rod 54, the end 56 and the rod 54 being connected by means of an intermediate part 58 of frustoconical shape. The diameter of the end 56 is likewise larger than the inside diameter of the tubular piece 52. Moreover, the rod 54 can comprise, in the vicinity of the intermediate part 58, a weakened zone or breaking zone obtained, for example, by making an annular groove.

During a vacuum-bleeding operation, the actuating member 50, that is to say the rod 54 onto which the tubular piece 52 has been slipped, is introduced into the bore 18. A force is exerted on the rod 54 in such a way that the end 56 comes into contact with the piston 20 and pushes the latter so as to put the shutter 24 into its first opening position, as illustrated by the lower half of FIG. 3. After the complete circuit has been put under a vacuum and subsequently filled with hydraulic fluid, made possible by the opening of the shutter 24, the force exerted on the rod 54 is released, and it is moved to the right (as seen in FIG. 3) so that it loses contact with the piston 20 after the shutter 24 has returned to its second position. By means of a suitable tool (not shown), the tubular piece 52 is then immobilized in its position, and then the rod 54 is pulled to the right (as seen in FIG. 3) so that its end 56 penetrates by means of the intermediate part 58 into the annular piece 52 as a result of the deformation of the latter and of the parts 56 and 58, as illustrated by the upper half of FIG. 3. The annular piece 52 and the end 56 forming a plug then interact to ensure the sealing of the bore 18 relative to the outside, and the rod 54 can then be broken in the vicinity of the intermediate part 58, this operation being made easier if a weakened zone or breaking zone has been provided at this location.

Figure 4:
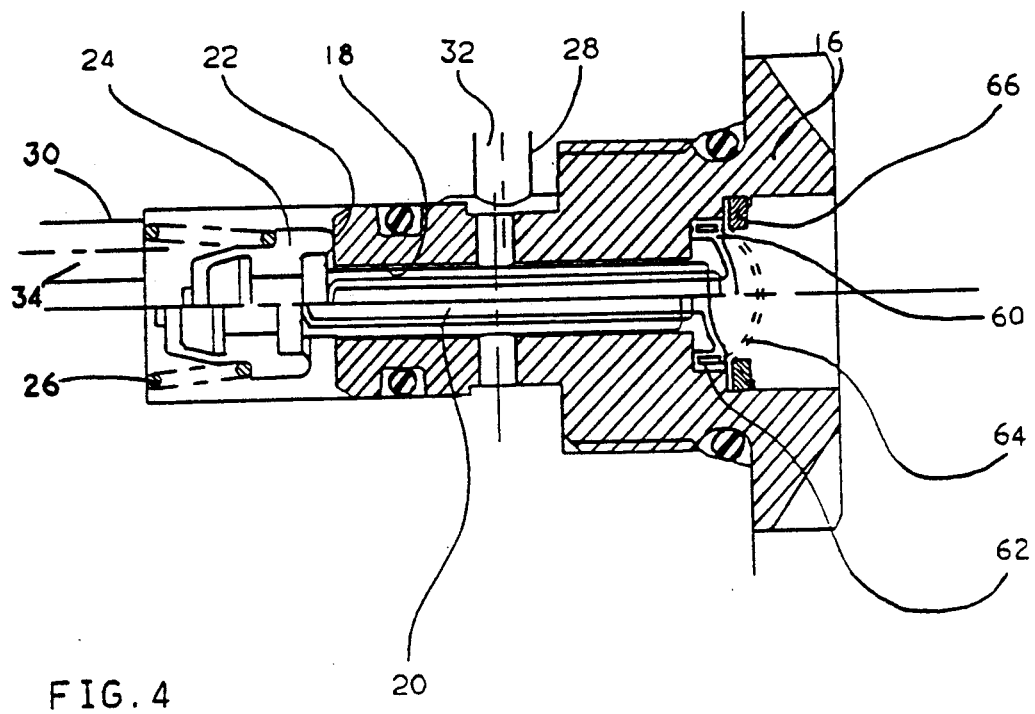
FIG. 4 shows a section through a third embodiment of a bleed valve produced according to the present invention.
Figure 5:
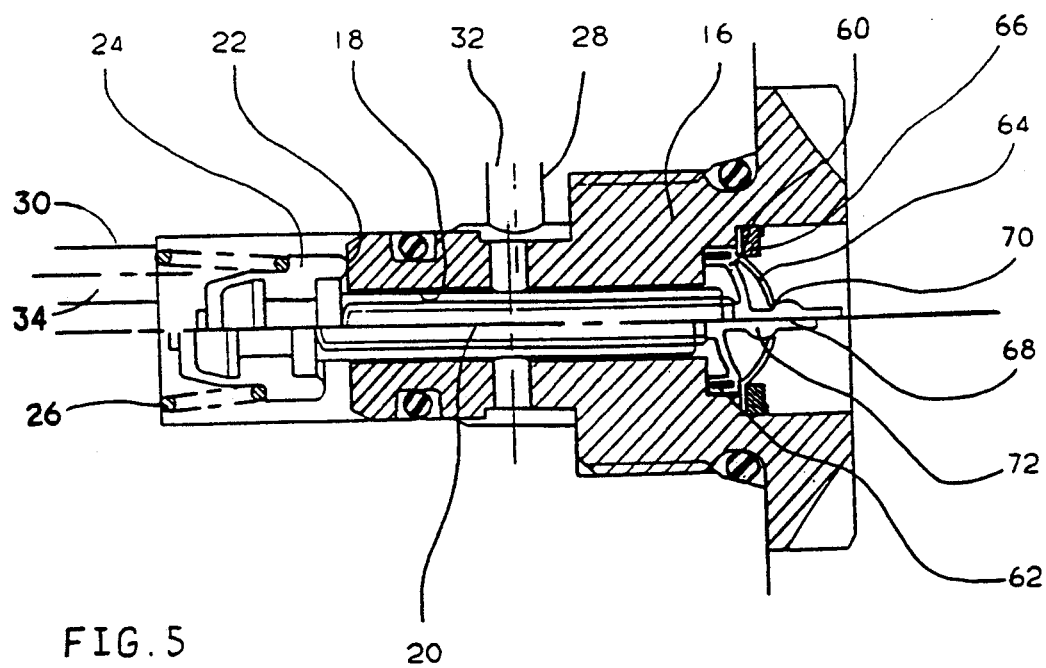
FIG. 5 shows a section through a fourth embodiment of a bleed valve produced according to the present invention.

FIGS. 4 and 5 show alternative forms of the embodiments of bleed valves.

The top half of these Figures shows the bleed valves in their rest positions, and the bottom half of these Figures shows the same valves during the bleeding operation.

A bleed valve as has been described above can be seen in FIG. 4, which comprises a piston 20 sliding in a bore 18 formed in a body 16. The left-hand end (when viewing FIG. 1) of the piston 20 forms a shutter 24 interacting with a valve seat 22 formed on the body 16. The shutter 24 is returned into its rest position by a spring 26 and, depending on its position, permits or prevents the communication between couplings 28 and 30 connected respectively to two subcircuits 32 and 34.

A diaphragm 60 is arranged at the end of the bore 18 opening out toward the outside, and situated on the right-hand side of FIG. 4 and in a widened part of the bore. This diaphragm 60 is fixed at its outer periphery to the body 16, it being possible for a cylindrical metal insert 62 advantageously to be provided in order to ensure the retention of this diaphragm. According to the invention, it can be seen that the diaphragm 60 performs both the role of making the bore 18 sealed with respect to the outside of the body 16, and the role of an actuating member. Indeed, during a vacuum-bleeding operation, a force is exerted with the aid of an appropriate tool on the diaphragm 60 in such a way that the force pushes the piston 20 in order to place the shutter 24 in a first open position in which its permits the communication between the two subcircuits 32 and 34, as illustrated in the bottom half of FIG. 4. After the whole circuit consisting of the two subcircuits has had a vacuum applied to it, and after the subsequent filling with hydraulic fluid, made possible by the shutter 24 being open, the force exerted on the diaphragm 60 is released, the diaphragm returning towards the right (when viewing FIG. 4) firstly under the effect of the spring 26 acting on the shutter 24 and on the piston 20 and then under the effect of the hydraulic pressure prevailing in the bore 18. The shutter 24 has then returned into a second closed position in which it prevents the communication between the two subcircuits 32 and 34, as illustrated in the top half of FIG. 4. The shutter 24 is then free to move under the effect of a difference between the pressures which are exerted on its two faces and which prevail in the subcircuits 32 and 34.

As shown in broken lines in FIG. 4, a cap 64 can be arranged, once the bleeding operation has been carried out, in proximity to the diaphragm 60, on the side of the latter which faces toward the outside, and therefore opposite that on which the piston 20 is situated. This cap 64 can be retained by a circlip 66 and simultaneously performs the role of a cap protecting the diaphragm 60 from any external attacks, and that of limiting the movement of the diaphragm toward the outside of the body 16. It will also be possible to provide, as an alternative, and for an opening to be made in its center, providing a passage f or the tool which is to exert a force on the diaphragm in order to carry out the bleeding operation.

An alternative form of the embodiment shown in FIG. 4 has been shown in FIG. 5, in which the same elements appear again, assigned the same reference numerals. It can be seen in this figure that a rod 68 has been provided in order to transmit a force to the diaphragm 60, this rod 68 passing through an opening 70 made in the cap 64. It can advantageously be provided for a bulge or enlargement 72, of external diameter slightly greater than that of the opening 70, to be formed on the rod 68 in proximity to its end situated near the diaphragm 60. Consequently, in the position of the valve shown in the bottom of FIG. 5, the rod 68 occupies a stable position in which it stresses the piston 20 and the shutter 24 counter to the spring 26 into the first open position of the shutter 24, without there being any need to exert a continuous force on the rod 68 in order to perform the vacuum-bleeding operation. Once this operation has been carried out, the rod 68 need only be pulled (toward the right in FIG. 5) with a sufficient force to cause the enlargement 72 to pass through the opening 70 in order to bring the rod 68 into the position shown in the top half of FIG. 5. As before, the diaphragm 60 is then free to return toward the right (when viewing FIG. 5), firstly under the effect of the spring 26 acting on the shutter 24 and the piston 20 and then under the effect of the hydraulic pressure prevailing in the bore 18, until it comes into contact with the cap 64.

In an alternative embodiment, it will be possible to provide for the diaphragm 60 and the rod 68 with its enlargement 72 to be made in a single piece. The diaphragm 60 will then occupy two stable positions depending on whether the enlargement 72 is situated inside or outside the cap 64. If the enlargement 72 is situated inside the cap 64, as shown in the bottom half of FIG. 5, the diaphragm occupies a stable position in which it stresses the piston 20 and the shutter 24 into the first open position of the shutter 24, and if the enlargement 72 is situated outside the cap 64, as shown in the top half of FIG. 5, the diaphragm 60 is then stressed toward the latter and permits the piston 20 and the shutter 24 to occupy the second closed position of the shutter 24, allowing the latter to move freely as a function of the differences between the hydraulic pressures in the subcircuits 32 and 34 and applied to its two faces.

It can therefore be clearly seen that the invention has made it possible to provide a valve allowing a hydraulic circuit to be bled by means of an actuating member coming into play for the bleeding operation, ensuring the sealing of the valve relative to the outside and not obstructing the subsequent movements of the shutter. The valve thus provided is especially simple and reliable and allows the bleeding of a hydraulic circuit according to a process which is itself especially simple. Although described in relation to a brake circuit, it is clear that the invention applies to any hydraulic circuit comprising sub-circuits separated by a valve and requiring bleeding.

What we claim is:

1. A bleed valve for a hydraulic circuit, comprising a piston slidable in a bore formed in a body and actuating a shutter arranged between two sub-circuits, the shutter movable between a first position, in which the shutter allows full communication between the two subcircuits, and a rest position, in which the shutter prevents such communication, and an actuating member, the shutter movable under the effect of a force exerted on the actuating member such that the actuating member displaces the piston, the actuating member including sealing means engageable with the bore to ensure sealing of the bore, and the shutter movable in one direction, independently of the actuating member, under the effect of a pressure differential existing between the two sub-circuits.

2. The valve according to claim 1, wherein the actuating member comprises a second piston movable in the bore.

3. The valve according to claim 2, wherein the second piston is movable between a shoulder formed in the bore and a stop piece at a bore end which opens externally of the body.

4. The valve according to claim 3, wherein the stop piece is a nut screwed to the bore end.

5. The valve according to claim 1, wherein the actuating member is a self-sealing element.

6. The valve according to claim 5, wherein the self-sealing element comprises a tubular piece and a rod.

7. The valve according to claim 5, wherein one end of the rod forms a plug interacting with the tubular piece.

8. The valve according to claim 7, wherein the rod comprises a breaking zone in the vicinity of the plug.

9. The valve according to claim 1, wherein the actuating member comprises an elastically deformable part.

10. The valve according to claim 1, wherein the elastically deformable part of the actuating member is fixed at an outer periphery to the body of the vale.

11. The valve according to claim 10, wherein the elastically deformable part of the actuating member comprises a diaphragm.

12. The valve according to claim 11, wherein the outer periphery is provided with a cylindrical metal insert.

13. The valve according to claim 12, wherein a cap is fixed to the body of the valve in proximity to the diaphragm and on a side of the diaphragm which is opposite that on which the piston is situated.

14. The valve according to claim 13, wherein the cap includes a central opening.

15. The valve according to claim 9, wherein the actuating member further comprises an actuating rod on a side of the actuating member which is opposite that on which the piston is situated.

16. The valve according to claim 15, wherein a cap is fixed to the body of the valve in proximity to the elastically deformable part and on a side of the elastically deformable part which is opposite that on which the piston is situated, and the actuating rod passes through a central opening of the cap.

17. The valve according to claim 16, wherein the actuating rod comprises, in proximity to an end situated near the elastically deformable part, an enlargement of external diameter greater than the diameter of the central opening of the cap, the enlargement defining two stable positions of the actuating member.

18. The valve according to claim 17, wherein the actuating rod and elastically deformable part comprise a single member.

19. A process for bleeding a hydraulic circuit which includes a valve according to claim 1, the process comprising the following steps:

exerting the force on the actuating member so that the actuating member displaces the piston and brings the shutter into the first position, vacuum bleeding the hydraulic circuit, and releasing the force exerted on the actuating member so that the shutter returns to the rest position under the effect of a return spring of the shutter, the shutter remaining movable in said one direction independently of the actuating member.

* * * * *